July 7, 1970  E. RANCE  3,519,919

FREQUENCY STABILIZING ELEMENT FOR METAL DETECTORS

Filed Dec. 11, 1968

EDWIN RANCE
*INVENTOR.*

BY

*Robert K. Rhea*
AGENT 3,519,919
FREQUENCY STABILIZING ELEMENT FOR
METAL DETECTORS
Edwin Rance, Plain Dealing, La. 71064
Continuation-in-part of application Ser. No. 658,171,
Aug. 3, 1967. This application Dec. 11, 1968, Ser.
No. 782,832
Int. Cl. G01v 3/10; H03b 21/00
U.S. Cl. 324—3                                                      1 Claim

ABSTRACT OF THE DISCLOSURE

In an object detector and discriminator circuit including first and second radio beat frequency oscillators and an inductor probe forming a tuned circuit a capacitive reaction element is placed in close proximity with the probe to compensate for temperature changes of the probe and maintain a balance of the beat frequency of the oscillators.

CROSS REFERENCE TO RELATED APPLICATION

The present invention is a continuation-in-part of an application filed by me in the United States Patent Office on Aug. 3, 1967, Ser. No. 658,171 for Object Detector and Discriminator Circuit.

BACKGROUND OF THE INVENTION

The present invention relates to object detectors and discriminators of the beat frequency type and more particularly to means compensating for temperature changes reaching the search coil for such detectors.

Ambient temperature changes, sun rays, immersion, etc. results in temperature and capacitance changes of search coils or probes and shields used in metal detectors of the beat frequency type. The resultant variation or change from one temperature to another of the search coil while being used in the field results in a detuning and unbalance of beat frequency of oscillators of the metal detectors. This detuning or change in beat frequency is undesirable in that it results in a likelihood of missing some buried object being searched for. Such undesirable characteristics of metal detector circuits can be obviated by a relatively simple counter-reaction element which is formed with or placed adjacent the search coil winding. In a beat frequency type metal detector employing first and second oscillators connected with a six inch diameter loop-type inductor coil or probe molded in epoxy plastic and operating at approximately 400 kc. a desired off-set effect was obtained by using twelve inches of commercially available 22 AWG shielded instrument wire or cable presently marketed under the trade name "Belden," placed in proximity of the coil with the inner conductor of the cable connected to the hot side of the tank coil of the second oscillator and the outside braided shield connected to common ground. The capacitance of the cable is extremely sensitive to temperature changes. Other satisfactory reaction elements may be formed from other temperature sensitive metallic material.

SUMMARY OF THE INVENTION

A capacitive reaction element is placed in close proximity with the shielded inductor search coil of a metal detector having first and second oscillators operating at a frequency of approximately 400 kc. The reaction element is connected to the hot side of the second oscillator tank and to common ground so that temperature changes simultaneously reaching the inductor search coil and the reaction element off-sets the change in beat frequency by adjusting the second oscillator's frequency in accordance with the change in frequency of the first oscillator as a result of temperature or capacitance change in the inductor search coil and/or the shield. The reaction element acts in a capacitive manner so that capacitance between the inner conductor of the reaction element and the outer shield thereof, increases with temperature.

Greater sensitivity, higher efficiency or "Q" and lower shield temperature effect can be obtained by shielding the inductor or search coil by using a plurality of juxtaposed thin metallic strips interconnected by a central section in turn center grounded. The thin strips surround or cover and underlies the search coil and thus form a shield.

DESCRIPTION OF THE PREFERRED EMBODIMENTS

Figure 1:
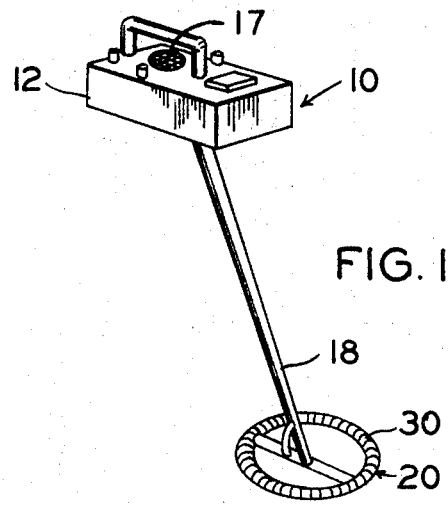
FIG. 1 is a perspective view of an object detector and discriminator having a shielded coil forming a probe modified in accordance with the present invention.

Like characters of reference designate like parts in those figures of the drawings in which they occur.

In the drawings:

The reference numeral 10 indicates a metal detector device comprising a housing 12 containing a first oscillator 14 and a second oscillator 16 tuned to beat together and connected with an audio amplifier, not shown, and a loud speaker 17. The device 10 is provided with a probe 18 having a shielded inductor search coil 20 formed in circular arrangement at the depending end of the probe 18 and connected with the first oscillator 14 by a coaxial cable 21. The circuit and function of the components of the metal detector 10 is fully described in my above referred to copending application Ser. No. 658,171, now Pat. No. 3,467,855, particularly lines 11 through 71 of col. 2, all of col. 3 and lines 1 through 20 of col. 4 which are incorporated in this application by reference.

Figure 2:
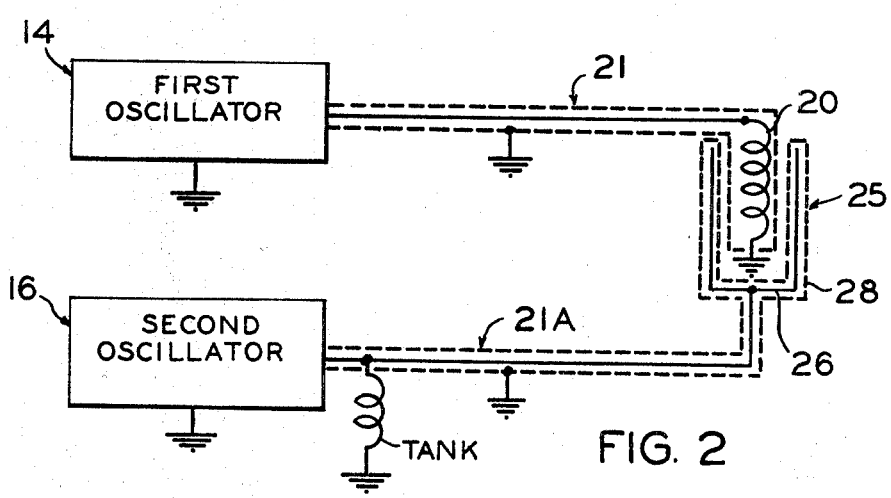
FIG. 2 is a wiring diagram.
Figure 3:
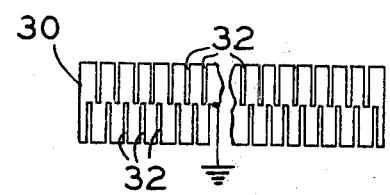
FIG. 3 is a fragmentary plan view of a low loss inductor shield formed from a sheet of foil.

In carrying out the invention, after numerous trial and error experiments, a production model was adopted using a six inch diameter shielded inductor coil 20, molded in epoxy plastic and operating at approximately 400 kilocycles. The preferred embodiment of a reaction element 25 consists of a twelve inch length of size 22 American Wire Gage instrument wire 26 commercially available under the trade name Belden and having a braided shield 28, with its two end portions placed in close proximity with the inductor coil 20, for example on both sides of the coil 20 as illustrated in FIG. 2 which was found to give the desired off-set effect. The instrument wire 26 is connected, intermediate its ends, to the hot side of the second oscillator tank by a coaxial cable 21A and the braid of the instrument wire 28 and coaxial cable 21A is connected to common ground. It will be noted, from an examination of FIG. 2, that the instrument wire 26 is electrically insulated from the braided shield 28. The position of the free ends of the reaction element 25, with respect to the inductor coil 20, is preferably such that temperature changes reach both the inductor coil 20 and the reaction element 25 simultaneously.

If search coil construction is unshielded or such that a temperature increase causes a frequency increase, then the special reaction element is wired directly to the first oscillator search coil circuit to give the desired off-set effect.

A shield for the search coil 20 may be formed from an elongated strip or sheet of lead or aluminum foil 30 wherein the foil is provided with parallel slits or slots 32 cut in its opposing marginal edges and extending outwardly from its longitudinal center line and spaced-apart one-eighth to one-fourth inch with the slots 32 on one side being staggered with respect to the slots 32 on the opposite side to retain a continuous conducting strip longitudinally of the foil. This slotted foil 30 is then wrapped around the shielded search coil, as illustrated in FIG. 1. The center portion of the foil is connected to common ground with the respective ends of the foil electrically isolated to prevent a direct conductive circuit. The separated segments, formed by slotting the foil, effectively breaks up eddy currents thus reducing losses usually present when using solid or unbroken shields. This type shield also tends to produce less capacity change with temperature variations.

Figure 4:
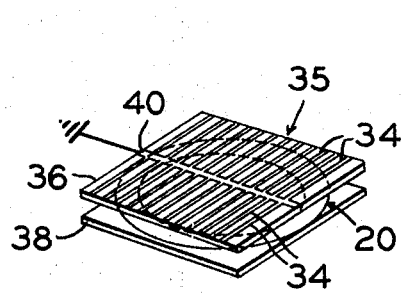
FIG. 4 illustrates an alternative embodiment of the inductor shield formed by circuit printed boards.

A modified form of this segmental shield, is indicated at 35 (FIG. 4), and may be formed by etching or printing a plurality of narrow electrical conductive segments or leads 34 in parallel spaced-apart relation on one side of each of two circuit boards 36 and 38. The printed boards 36 and 38 are then clamped together with the inductor search coil 20 interposed between the boards. These printed boards are each provided with a grounding lead or conductor 40 extending centrally of the respective boards and connected with each lead 34. The conductor 40 is connected to common ground.

OPERATION

In operation the first and second oscillators 14 and 16 are tuned to produce a desired beat frequency, for example 50 cycles through an audio amplifier and loud speaker, and as temperature changes affect the shielded inductor coil 20 and reaction element 25, such as a thermal increase, resulting in a resonant frequency decrease, the reaction element off-sets the change in frequency of the first oscillator 14 by a capacitance increase in the tuning circuit of the second oscillator coil thus resulting in a corresponding decrease in the second oscillator's frequency in accordance with the thermal increase. Thus, the beat frequency signal remains substantially undisturbed.

Obviously the invention is susceptible to changes or alterations without defeating its practicability, therefore, I do not wish to be confined to the preferred embodiments shown in the drawings and described herein.

I claim:

1. In a metal detector including first and second oscillators, said first oscillator establishing a field of radiated radio frequency energy, and an inductor connected with said first oscillator and radiating such energy and responding to the electrical conductivity of objects to be detected, the improvement comprising: frequency stabilizing means for said detector including thermally sensitive capacitive means comprising a length of shielded instrument wire having its end portions disposed adjacent said inductor and having an inner wire electrically insulated from its outer metallic shield, said inner wire being connected with the hot side of said second oscillator and said metallic shield being grounded.

References Cited

UNITED STATES PATENTS

| | | | |
|---|---|---|---|
| 1,320,980 | 11/1919 | Bowman | 336—84 |
| 1,651,922 | 12/1927 | Hughes | 174—35 |
| 1,850,580 | 3/1932 | Coram | 331—41 |
| 2,288,735 | 7/1942 | O'Connell | 174—35 XR |
| 2,417,785 | 3/1947 | Slepian | 174—35 XR |
| 2,442,805 | 6/1948 | Gilson | 324—3 XR |
| 2,786,984 | 3/1957 | Slate | 336—84 |
| 3,181,057 | 4/1965 | Bravenec | 324—6 XR |

FOREIGN PATENTS

| | | |
|---|---|---|
| 1,073,614 | 1/1960 | Germany. |

GERARD R. STRECKER, Primary Examiner

U.S. Cl. X.R.

331—41